Patented Nov. 27, 1951

2,576,768

UNITED STATES PATENT OFFICE 2,576,768

TRISAZO DYESTUFFS

Walter Anderau, Basel, Switzerland, assignor to Ciba Limited, Basel, Switzerland, a Swiss firm No Drawing. Application October 4, 1948, Serial No. 52,777. In Switzerland November 19, 1947

6 Claims. (Cl. 260—173)

According to this invention valuable new trisazo-dyestuffs containing a single sulfonic acid group are made by coupling a diazo compound of an amine of the general formula

in which $R_1$ represents a benzene radical free from sulfonic acid groups and containing a hydroxyl group and a carboxyl group in ortho-position relatively to one another, and $R_2$ represents a benzene radical free from sulfonic acid groups and to which the azo-linkage and the diazotizable amino group are bound in the 1:4-position relatively to one another, and which contains in ortho-position to the diazotizable amino group a group —O—$R_4$, wherein $R_4$ represents a saturated radical containing, in addition to at the most 3 carbon atoms bound directly to one another, only the elements O and H, such as an alkoxy group having 1 to 3 carbon atoms or a carboxyalkoxy group having 2 to 3 carbon atoms, in an alkaline medium with a monoazo dyestuff of the general formula

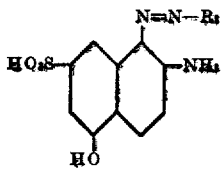

in which $R_3$ represents a benzene radical free from sulfonic acid groups and which contains in ortho-position to the azo linkage a carboxyl group or a carboxyalkoxy group having 2 or 3 carbon atoms, and also contains a nitro group.

As carboxyalkoxy groups having 2 or 3 carbon atoms there are to be understood groups of the general formula —O—($C_nH_{2n}$)—COOH, in which $n$ represents the whole number 1 or 2.

The amines corresponding to the above formula $R_1$—N=N—$R_2$—$NH_2$, which are used as starting materials in the present invention, can be obtained, for example, by coupling a diazo compound of an amino-hydroxybenzene-ortho-carboxylic acid with a 1-aminobenzene capable of coupling in the 4-position, and which contains in the 2-position an alkoxy group having 1 to 3 carbon atoms or a carboxyalkoxy group having 2 or 3 carbon atoms. The amino-hydroxybenzene-ortho-carboxylic acid or the 1-amino - 2 - alkoxybenzene or 1-amino-2-carboxyalkoxybenzene may contain further substituents. As such substituents, in the case of the amino - hydroxybenzene - ortho - carboxylic acids, there come into consideration, for example, alkyl groups such as methyl groups, alkoxy groups such as methoxy groups, halogen atoms such as bromine and especially chlorine, nitro groups, sulfonic acid amide groups, etc. Thus, for example, 6-amino-4-nitro-1-hydroxybenzene-2-carboxylic acid may be used as a starting material. In some cases it is of advantage to use 4-amino-1-hydroxybenzene-2-carboxylic acid or a derivative thereof, which contains in the 6-position one of the above mentioned substituents. As examples of such compounds there may be mentioned, 6-methyl, 6-chloro- and 6-nitro-4-amino-1-hydroxybenzene-2-carboxylic acid.

Among the 1-amino-2-alkoxybenzenes having a free 4-position used as coupling components for making the amines of the formula

there come into consideration principally 2-ethoxy- and 2-methoxy-1-aminobenzenes which contain in the 5-position a substituent which favors coupling, for example, an alkyl group such as a methyl group or an alkoxy group, such as an ethoxy- or methoxy - group. As examples of such compounds there may be mentioned: 1-amino-2-methoxy-5 - methylbenzene, 1 - amino-2:5-dimethoxy-benzene, 1-amino-2:5-diethoxybenzene and 1-amino - 2 - propionoxy-5-methoxybenzene. When 1 - amino-2-alkoxybenzenes, which are free from further substituents, are used such as 1-amino-2-methoxy- or 1-amino-2-ethoxy-benzene, they are advantageously used in the form of their so-called ω-methane sulfonic acids. As an example of a 1-amino-2-carboxyalkoxybenzene there may be mentioned 1-amino-2-carboxymethoxy-5-methylbenzene of the formula

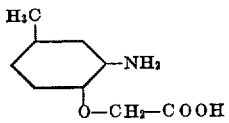

The coupling of the diazotized amino-hydroxy-benzene-otho-carboxylic acid with the 1-amino-2-alkoxy- or 1-amino-2-carboxyalkoxy-benzene coupling in the 4-position to produce the starting material of the above mentioned formula $$R_1-N=N-R_2-NH_2$$

may be carried out in a manner in itself known in an acid medium, advantageously in a medium rendered acid with acetic acid.

Several of the amines of the formula $$R_1-N=N-R_2-NH_2$$

serving as starting materials in the present invention can be made by coupling a diazotized 1-amino-3-alkoxy- or 1-amino-3-carboxyalkoxy-benzene which contains in the 4-position a group convertible into an amino group, for example, a nitro or acylamino group, with a hydroxybenzene-ortho-carboxylic acid capable of coupling, and converting into the amino group the nitro or acylamino group present in the resulting dyestuff. By this method there can be prepared, for example, the amine coming into consideration as a starting material for the present invention, 4-amino-3-methoxy-4'-hydroxy-5'-methyl-1:1'-azobenzene-3'-carboxylic acid.

The monoazo dyestuffs of the general formula

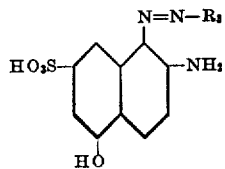

in which $R_3$ has the meaning given above, also used as starting materials in the present invention, may be made by coupling a diazotized non-sulfonated 1-amino-benzene, which contains in the 2-position a carboxyl group or a carboxyalkoxy group, in any desired position, advantageously in the 4-position, a nitro group, and, if desired, further substituents, with 2-amino-5-hydroxynaphthalene-7-sulfonic acid in an acid, advantageously a mineral acid, medium. As an example of such an amine there may be mentioned, inter alia: 1-amino-2-carboxymethoxy-4-nitro-5-methylbenzene. As a rule especially good results are obtained with 1-amino-4-nitrobenzene-2-carboxylic acid.

The diazotization of the amines of the general formula $R_1-N=N-R_2-NH_2$ used as starting materials in the invention, and also of the amines of the formula $H_2N-R_3$ used for making the starting materials of the above formula

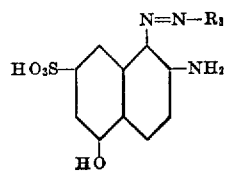

may be carried out, for example, by the so-called indirect method, that is to say by coupling a solution containing an alkali salt of the amine and also the necessary quantity of nitrite with a dilute acid solution containing a quantity of acid, especially hydrochloric acid, in excess of the theoretical amount.

The coupling of the diazo compound of the amine of the general formula $R_1-N=N-R_2-NH_2$ with the monazo dyestuff of the general formula

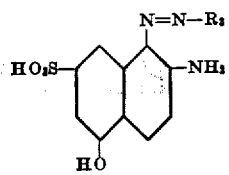

is conducted in an alkaline medium, advantageously a medium rendered alkaline with an alkali carbonate, if desired with the addition of a suitable agent favoring the coupling reaction or capable of binding acid, such as pyridine, an ethanolamine or the like.

The triasazo-dyestuffs obtainable by the invention are new. They contain a single sulfonic acid group and in the form of the free acids correspond to the general formula

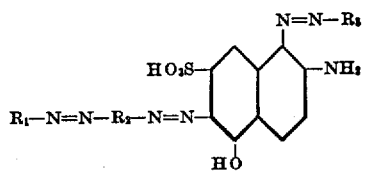

in which $R_1$ stands for a benzene radical which contains a hydroxyl group and a carboxyl group in ortho-position relatively to one another, and $R_2$ stands for a benzene radical to which the two azo-linkages are bound in para-position relatively to one another and which contains in ortho-position relatively to the azo-linkage bound to the naphthalene nucleus a group —O—$R_4$, wherein $R_4$ represents a saturated radical containing, in addition to at the most 3 carbon atoms bound directly to one another, only the elements O and H, and $R_3$ stands for a benzene radical which contains in ortho-position to the azo-linkage a carboxy group or a carboxyalkoxy group having 2 or 3 carbon atoms, and also contains a nitro group.

These dyestuffs are suitable for dyeing a very wide variety of materials, for example, animal fibers such as wool, silk or leather, but especially for dyeing or printing cellulosic materials such as cotton, linen, artificial silk and staple fibers of regenerated cellulose. The dyestuffs may be converted in substance, in the dye-bath or on the fiber into complex metal compounds for example, copper, chromium, iron, nickel or cobalt compounds. The conversion into such complex metal compounds is carried out by known methods in an acid, neutral or alkaline medium at atmospheric or superatmospheric pressure, with or without additions such as salts of inorganic or organic acids such as tartaric acid, agents capable of favoring the formation of complexes or of binding acid such as pyridine. Owing to the fact that the dyestuffs obtainable by the invention contain but few groups imparting solubility and in the metal-free condition possess an adequate or good affinity for cellulose fibers they may, with advantage, be treated on the fiber or in part on the fiber and in part in the dyebath with an agent yielding metal by the known general methods. It is of advantage to use the process of U. S. Patent 2,148,659 in which first the dyeing and then the treatment with an agent yielding metal are carried out in the same bath. As agents yielding metal there come into consideration, advantageously, those which are stable towards alkaline solutions, such as complex copper tartrates and the like.

In some cases especially valuable dyeings are produced by using a process in which dyeings or prints produced with the metal-free dyestuff are after treated with an aqueous solution which contains a basic condensation product of formaldehyde with a compound containing at least once the atomic grouping

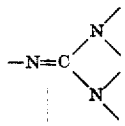

or with a compound easily convertible into such a compound, for example, cyanamide, and also contains a water-soluble, especially complex, copper compound. Such a process is described, for example, in French Patent No. 929,599. This process gives valuable results above all when it is desired to produce dark tints, for example, deep navy blue tints, with the dyestuffs obtainable by the present invention.

The following examples illustrate the invention, the parts and percentages being by weight:

Example 1

18.2 parts of 4 - nitro - 1 - amino - 2 - carboxybenzene are dissolved in 300 parts of water with the aid of 15 parts of ammonia solution of 30 per cent. strength, and then mixed with 6.9 parts of sodium nitrite and cooled with ice to 4° C. By the addition of 40 parts of hydrochloric acid of 30 per cent. strength there is obtained in a short time the diazo compound, which is then mixed with a freshly precipitated suspension of 23.9 parts of 2-amino-5-hydroxynaphthalene-7-sulfonic acid in 200 parts of water. The coupling which sets in can be accelerated by the addition of an agent capable of binding mineral acid, such as sodium acetate or sodium formate. After about 15 hours the coupling is complete. The dyestuff suspension is warmed to 50–60° C., 10–15 parts of sodium carbonate are added for the purpose of neutralization, and the dyestuff is completely precipitated by the addition of sodium chloride and separated by filtration. The filter paste is washed with about 100 parts of a solution of sodium chloride of 5 per cent. strength, and is then dissolved in 500 parts of water at 40–60° C. with the addition of 40 parts of anhydrous sodium carbonate and the solution is then cooled with ice to 0–2° C.

30.1 parts of the monoazo-dyestuff (obtained by coupling the diazo-compound from 15.3 parts of 4-amino-1-hydroxybenzene-2-carboxylic acid in an acid medium with 13.7 parts of 1-amino-2-methoxy-5-methylbenzene) are suspended in 300 parts of water, dissolved by neutralization with sodium hydroxide solution, and diazotized in the presence of 25 parts of hydrochloric acid of 30 per cent. strength with 6.9 parts of sodium nitrite. The resulting diazo-azo-compound is coupled with the alkaline solution of the monoazo dyestuff obtained as described above. The trisazo dyestuff, which forms immediately, precipitates for the greater part. After a short time the whole is heated to 60° C., 100 parts of sodium chloride are added in order to obtain the dyestuff in a good filterable form, and the latter is separated by filtration and dried. A black powder is obtained which dissolves in water, in dilute sodium carbonate solution and also in concentrated sulfuric acid with a violet-blue coloration.

The dyestuff, which corresponds to the formula

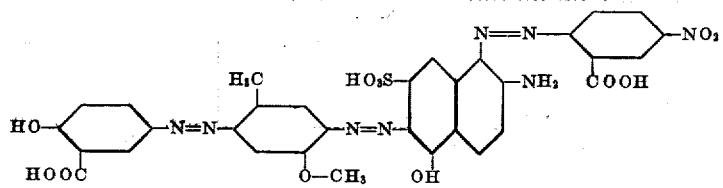

dyes vegetable fibers and fibers of regenerated cellulose from a sodium sulfate bath, which is neutral or rendered weakly alkaline with sodium carbonate, navy blue tints, which when treated with an agent yielding metal, especially a copper salt, are fast to washing and light. Especially valuable navy blue tints fast to washing and light are produced by dyeing cotton with this dyestuff by the single bath or two-bath after coppering process, for example, by the method in which the dyeing produced with the metal-free dyestuff is after-treated in an aqueous solution which contains a basic condensation product of formaldehyde with a compound containing at least once the atomic grouping

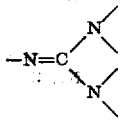

or with a compound easily convertible into such a compound, for example, cyanamide, and also contains a water-soluble copper compound.

In the following table are given examples of trisazo dyestuffs having similar properties which can be made by the procedure described in the above example, by coupling a diazo compound of the amine in column I with the middle component given in column II, diazotizing the resulting amino-azo dyestuff and coupling it in an alkaline medium with the monoazo dyestuff obtained by coupling the diazo compound of the amine specified in column III in an acid medium with 2-amino-5-hydroxynaphthalene-7-sulfonic acid.

| | I | II | III | Color of solution in dilute sodium carbonate solution | Color of solution in concentrated sulfuric acid | Color of after-coppered dyeing on cotton |
|---|---|---|---|---|---|---|
| 1 | HO–⌬–NH₂, HOOC | H₃C–O–⌬–NH₂, O–CH₃ | H₂N–⌬–NO₂, HOOC | red-blue | red-blue | greenish navy blue. |
| 2 | do | H₃C–⌬–NH₂, O–CH₂–COOH | do | blue-violet | blue-green | reddish navy blue. |
| 3 | do | H₃C–O–⌬–NH₂, O–CH₂–COOH | do | blue | blackish grey | blue. |
| 4 | do | H₅C₂–O–⌬–NH₂, O–C₂H₅ | do | red-blue | red-blue | Do. |
| 5 | do | H₃C–⌬–NH₂, O–CH₃ | H₂N–⌬–NO₂ with CH₃ and O–CH₂–COOH | violet-blue | blue | reddish-blue. |
| 6 | H₃C–⌬(HO)(HOOC)–NH₂ | Do | H₂N–⌬–NO₂, HOOC | do | violet-blue | navy blue. |

The dyestuffs of the preceding table correspond to the following formulae:

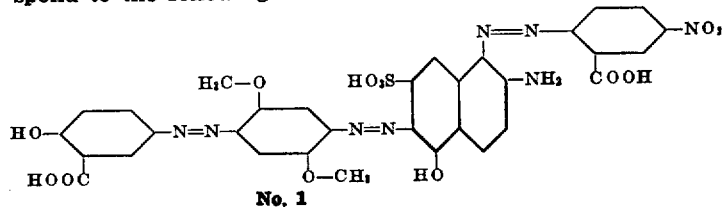

No. 1

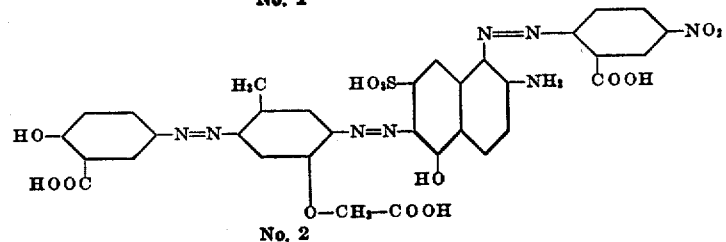

No. 2

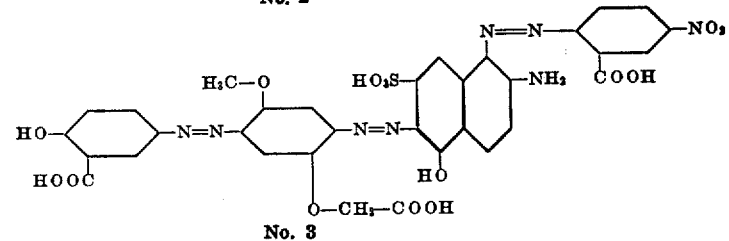

No. 3

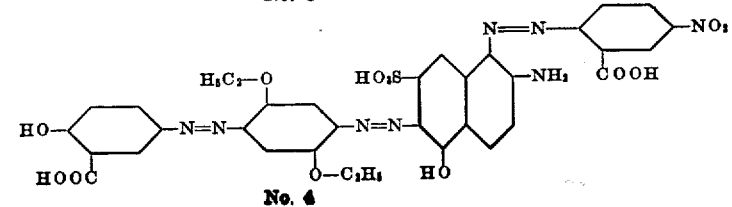

No. 4

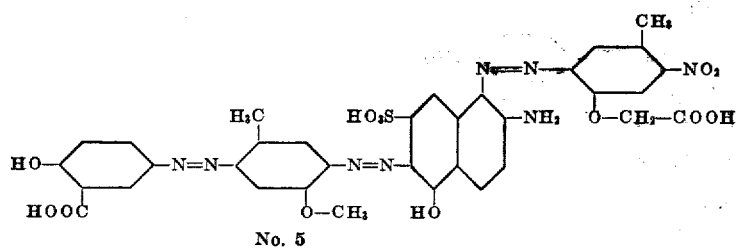

No. 5

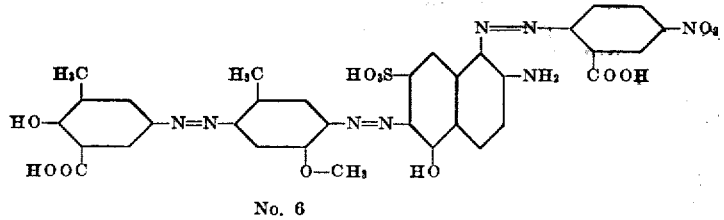

No. 6

Example 2

100 parts of cotton are entered at 50° C. into a dyebath consisting of 4000 parts of water, 2 parts of anhydrous sodium carbonate and 2 parts of the dyestuff obtainable as described in the first paragraph of Example 1, the temperature is raised to 90–95° C. in the course of 20 minutes, 30 parts of crystalline sodium sulfate are added and dyeing is carried on for 30 minutes at 90–100° C. The whole is then allowed to cool to about 70° C. and the further treatment is as described under (a) or (b) or (c).

(a) The dyeing is rinsed with cold water and treated at 50° C. for ½ hour in a bath containing 4000 parts of water, 3 parts of crystalline copper sulfate and 1 part of acetic acid. The goods are then rinsed and dried. A navy blue dyeing is obtained of good fastness to light and having very good properties of wet fastness.

(b) 4 parts of complex copper-sodium tartrate of approximately neutral reaction are added to the dyebath cooled to about 70° C., coppering is carried on for ½ hour at 80° C., and the dyeing is rinsed in cold water. If desired, the dyeing may be soaped by after-treatment for ½ hour in a bath containing per liter of water, 5 grams of Marseilles soap and 2 grams of anhydrous sodium carbonate. A navy blue dyeing is obtained of good fastness to light and good properties of wet fastness.

(c) The dyeing is rinsed in cold water and then after-treated for ½ hour at 20° C. in a solution, which has been prepared by dissolving 4.5 parts of the water-soluble condensation product from dicyandiamide and formaldehyde, 1.5 parts of copper acetate and 6 parts of concentrated aqueous ammonia solution in 3000 parts of water, and adding 2 parts of anhydrous sodium carbonate to the solution containing cupritetramine acetate. The goods are then rinsed and dried. A navy blue dyeing is obtained which is distinguished by good fastness to light and very good properties of wet fastness.

What is claimed is:

1. A triasazo dyestuff containing a single sulfonic acid group and corresponding to the formula

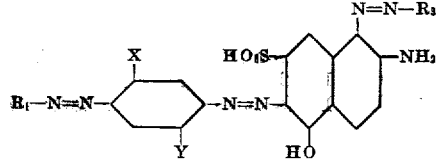

in which $R_1$ stands for a benzene radical which contains a hydroxyl group and a carboxyl group in ortho-position relatively to one another, X stands for a member selected from the group consisting of the radicals —$CH_3$, —O—$CH_3$ and —O—$C_2H_5$, Y stands for a member selected from the group consisting of the radicals —O—$CH_3$, —O—$C_2H_5$ and —O—$CH_2$—COOH, and $R_3$ stands for a benzene radical which contains in ortho-position to the azo-linkage a member selected from the group consisting of the radicals —COOH and —O—$CH_2$—COOH, and also contains a nitro group.

2. The trisazo dyestuff of the formula

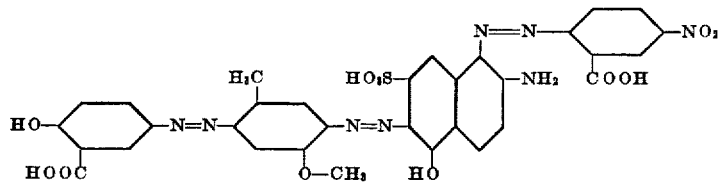

3. The trisazo dyestuff of the formula

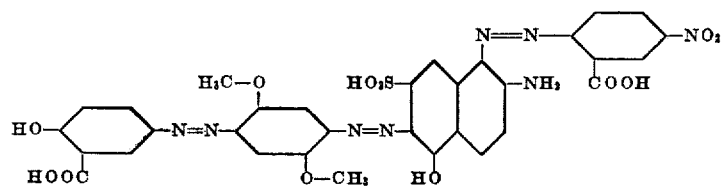

4. The trisazo dyestuff of the formula
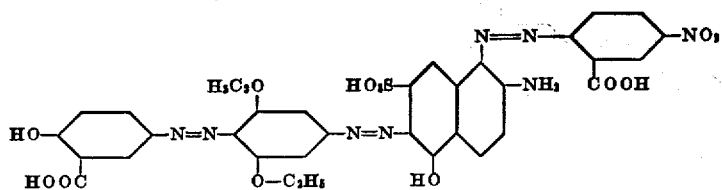
5. The trisazo dyestuff of the formula
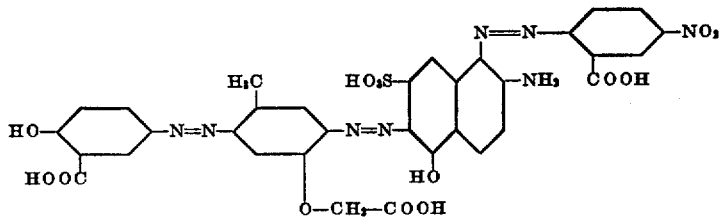
6. The trisazo dyestuff of the formula
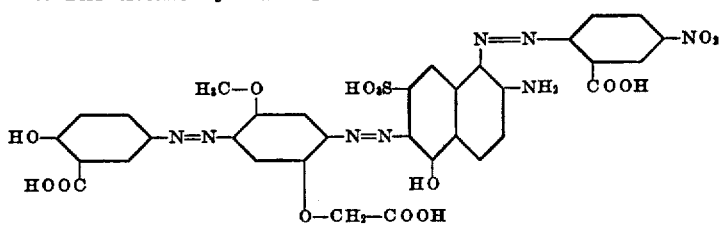
WALTER ANDERAU.
REFERENCES CITED
The following references are of record in the file of this patent:
UNITED STATES PATENTS
| Number | Name | Date |
|---|---|---|
| 1,876,560 | Brightman | Sept. 13, 1932 |
| 2,242,456 | Delfs et al. | May 20, 1941 |
| 2,417,306 | Krebser et al. | Mar. 11, 1947 |
| 2,471,664 | Wehrli et al. | May 31, 1949 |
FOREIGN PATENTS
| Number | Country | Date |
|---|---|---|
| 497,350 | Great Britain | Dec. 19, 1938 |

Certificate of Correction

Patent No. 2,576,768 November 27, 1951

WALTER ANDERAU

It is hereby certified that error appears in the printed specification of the above numbered patent requiring correction as follows:

Column 1, line 41, for "formua" read *formula*; column 3, line 10, for "otho" read *ortho*; column 4, line 10, for "monazo" read *monoazo*; line 28, for "triasazo" read *trisazo*; column 6, for that portion of the formula reading

read column 10, lines 26 and 27, for "cupritetramine" read *cupritetrammine*; and that the said Letters Patent should be read as corrected above, so that the same may conform to the record of the case in the Patent Office.

Signed and sealed this 11th day of March, A. D. 1952.

[SEAL]

THOMAS F. MURPHY,
*Assistant Commissioner of Patents.*